US010846719B2

(12) United States Patent
Madhow et al.

(10) Patent No.: US 10,846,719 B2
(45) Date of Patent: *Nov. 24, 2020

(54) DETERMINING A TOPOLOGICAL LOCATION OF A CLIENT DEVICE USING RECEIVED RADIO SIGNATURES

(71) Applicant: Uber Technologies, Inc., San Francisco, CA (US)

(72) Inventors: Upamanyu Madhow, Santa Barbara, CA (US); Daniel Iland, Oakland, CA (US); Dinesh Ramasamy, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/016,504

(22) Filed: Jun. 22, 2018

(65) Prior Publication Data

US 2018/0341964 A1 Nov. 29, 2018

Related U.S. Application Data

(63) Continuation of application No. 15/604,183, filed on May 24, 2017, now Pat. No. 10,032,181.

(51) Int. Cl.
*G06Q 30/02* (2012.01)
*G01C 21/34* (2006.01)
(Continued)

(52) U.S. Cl.
CPC ..... *G06Q 30/0205* (2013.01); *G01C 21/3492* (2013.01); *H04W 4/029* (2018.02);
(Continued)

(58) Field of Classification Search
CPC ..... H04W 4/021; H04W 4/026; H04W 4/027; H04W 4/029; G06Q 30/0205;
(Continued)

(56) References Cited

U.S. PATENT DOCUMENTS 6,832,092 B1 12/2004 Suarez et al.
8,320,939 B1 11/2012 Vincent
(Continued)

FOREIGN PATENT DOCUMENTS

KR 10-2010-0053717 A 5/2010
WO WO 2004/013733 A2 2/2004
WO WO 2015/051132 A1 4/2015

OTHER PUBLICATIONS

United States Office Action, U.S. Appl. No. 15/672,043, dated Nov. 14, 2019, 17 pages.
(Continued)

*Primary Examiner* — Atul Trivedi
(74) *Attorney, Agent, or Firm* — Fenwick & West LLP (57) ABSTRACT

A network system, such as a transport management system, efficiently allocates resources by monitoring the geospatial and topological locations of a rider responsive to receiving a trip request. A trip management module matches a rider with an available driver based in part on an comparison of the estimated times of arrival of the rider and the driver at the pickup location. A client positioning module monitors the rider's progress through nodes and edges in a topological graph associated with the origin location based on radio signatures received at the rider client device. A client ETA module calculates a rider ETA based on the rider's rate of travel through the origin location represented by nodes in the topological graph. Responsive to determining that the rider ETA and the driver ETA vary by over a threshold amount of time, the trip management module matches the rider with a second available driver.

22 Claims, 6 Drawing Sheets

(51) Int. Cl.
*H04W 4/029* (2018.01)
*H04L 29/08* (2006.01)
*H04W 4/021* (2018.01)
*H04W 4/02* (2018.01)
*G07B 15/02* (2011.01)

(52) U.S. Cl.
CPC ............... *G07B 15/02* (2013.01); *H04L 67/18* (2013.01); *H04M 2242/14* (2013.01); *H04W 4/021* (2013.01); *H04W 4/026* (2013.01); *H04W 4/027* (2013.01)

(58) Field of Classification Search
CPC ............... H04M 2242/14; H04L 67/18; G01C 21/3492; G07B 15/02
USPC ........................................................ 701/410
See application file for complete search history.

(56) References Cited

U.S. PATENT DOCUMENTS

| | | | |
|---|---|---|---|
| 8,359,045 B1 | 1/2013 | Hopkins | |
| 8,994,591 B2* | 3/2015 | Dupray | H04W 4/90 342/457 |
| 9,395,190 B1 | 7/2016 | Young et al. | |
| 9,510,154 B2 | 11/2016 | Mori et al. | |
| 9,716,974 B2 | 7/2017 | Yamasaki et al. | |
| 9,784,887 B1* | 10/2017 | Ulmer | G01S 7/4813 |
| 10,032,181 B1 | 7/2018 | Madhow | H04W 4/029 |
| 10,234,305 B2* | 3/2019 | Madine | G06F 16/29 |
| 10,281,293 B2* | 5/2019 | Musabji | G06T 11/00 |
| 2006/0059023 A1 | 3/2006 | Mashinsky | |
| 2006/0155460 A1 | 7/2006 | Raney | |
| 2009/0156241 A1 | 6/2009 | Staffaroni et al. | |
| 2009/0315704 A1* | 12/2009 | Rosing | G06Q 10/08 340/539.13 |
| 2010/0114626 A1 | 5/2010 | Piccinini | |
| 2010/0318294 A1* | 12/2010 | Rosing | G01C 21/165 701/500 |
| 2013/0006515 A1* | 1/2013 | Vellaikal | G01C 21/3679 701/410 |
| 2013/0013381 A1 | 1/2013 | Liu | |
| 2013/0073336 A1* | 3/2013 | Heath | G06Q 30/02 705/7.29 |
| 2013/0281111 A1 | 10/2013 | Syrjarinne et al. | |
| 2014/0011518 A1 | 1/2014 | Valaee et al. | |
| 2014/0045529 A1* | 2/2014 | Bolon | H04W 4/021 455/456.1 |
| 2014/0074536 A1 | 3/2014 | Meushar et al. | |
| 2014/0179341 A1 | 6/2014 | Sydir et al. | |
| 2014/0335893 A1 | 11/2014 | Ronen | |
| 2014/0378159 A1 | 12/2014 | Dolbakian et al. | |
| 2015/0254581 A1 | 9/2015 | Brahme | |
| 2015/0279216 A1 | 10/2015 | Ghanma | |
| 2016/0055605 A1 | 2/2016 | Kim et al. | |
| 2016/0104377 A1* | 4/2016 | French | G08G 1/012 701/117 |
| 2016/0123748 A1* | 5/2016 | Chidlovskii | G01C 21/3453 701/410 |
| 2016/0195602 A1* | 7/2016 | Meadow | G01S 5/0221 701/517 |
| 2016/0203576 A1 | 7/2016 | Novak | |
| 2016/0232719 A1 | 8/2016 | Brinig et al. | |
| 2016/0327956 A1* | 11/2016 | Zhang | G05D 1/005 |
| 2016/0334235 A1* | 11/2016 | Gustafson | G01C 21/3492 |
| 2016/0364678 A1* | 12/2016 | Cao | G06Q 50/30 |
| 2016/0364679 A1* | 12/2016 | Cao | G06Q 50/30 |
| 2016/0364812 A1* | 12/2016 | Cao | G06Q 50/30 |
| 2016/0364823 A1* | 12/2016 | Cao | G06Q 50/30 |
| 2017/0011324 A1 | 1/2017 | Truong et al. | |
| 2017/0059347 A1 | 3/2017 | Flier | |
| 2017/0059353 A1* | 3/2017 | Madine | G06F 16/29 |
| 2017/0075536 A1 | 3/2017 | Cho et al. | |
| 2017/0078380 A1 | 3/2017 | Aggarwal et al. | |
| 2017/0104629 A1 | 4/2017 | Cobb | |
| 2017/0129603 A1* | 5/2017 | Raptopoulos | G05D 1/0676 |
| 2017/0147959 A1 | 5/2017 | Sweeney et al. | |
| 2017/0186056 A1 | 6/2017 | Amin et al. | |
| 2017/0227370 A1 | 8/2017 | O'Mahony et al. | |
| 2017/0227371 A1 | 8/2017 | O'Mahony et al. | |
| 2017/0370728 A1* | 12/2017 | Kordari | G01C 21/206 |
| 2020/0051442 A1* | 2/2020 | S. | G08G 5/0021 |

OTHER PUBLICATIONS

Klein, M., "How to Disable Google Location Wi-Fi Scanning on Android," How-To Geek, Mar. 6, 2015, nine pages.
PCT International Search Report and Written Opinion, PCT Application No. PCT/IB2018/053672, Sep. 17, 2018, 18 pages.
PCT International Search Report and Written Opinion, PCT Application No. PCT/IB2018/054775, Dec. 13, 2018, eight pages.
United States Office Action, U.S. Appl. No. 15/604,183, dated Aug. 22, 2017, 12 pages.
United States Office Action, U.S. Appl. No. 15/672,043, dated Mar. 5, 2020, six pages.
United States Office Action, U.S. Appl. No. 16/016,501, dated Apr. 16, 2020, 17 pages.

* cited by examiner

FIG. 6

DETERMINING A TOPOLOGICAL LOCATION OF A CLIENT DEVICE USING RECEIVED RADIO SIGNATURES

CROSS REFERENCE TO RELATED APPLICATIONS

This application is a continuation of co-pending U.S. application Ser. No. 15/604,183, filed May 24, 2017, which is incorporated by reference in its entirety.

TECHNICAL FIELD

The described embodiments generally relate to the field of network systems, and, more particularly, to determining a topological location of a rider client device based on the relative signal strength of received radio signals.

BACKGROUND

Network systems, such as transport management systems, provide support for logistical issues in managing the transportation of people, cargo, or the like. In some systems, a driver provides transportation services to a rider to a location selected by the rider. In typical systems, a rider requesting service is matched with one of a plurality of available drivers based at least in part on the pickup location, the destination location, the current location of the available driver, and a comparison of the requested pickup time at a pickup location and the estimated time of arrival of the driver at the pickup location. Typically, however, a rider is presumed to be at the pickup location when the request is made. Therefore, the rider's location and estimated time of arrival at the pickup location are not monitored after the rider makes the initial trip request, such that a driver could have to wait at the pickup location for several minutes if the rider is delayed. This may lead to inefficient allocation of resources, particularly in instances where there is high rider demand concentrated in a geographic region.

SUMMARY

To optimize driver dispatch and ensure a more efficient allocation of resources, a network system monitors the topological location of a rider responsive to the rider submitting a request for service (e.g., transport of delivery services, also referred to as a trip) through a rider application.

A trip management module receives, through the rider application, rider input comprising a set of service data. In one embodiment, the service data includes at least an origin location, a destination location, a desired departure time, and a request for a driver associated with the network system to transport the rider from the origin location to the destination location. The origin location is a physical location over a threshold size and encompasses the location from which the trip begins (e.g., a pickup location). In some embodiments, the origin location includes a semantic label (e.g., San Francisco International Airport). In other embodiments, the origin location is unlabeled and is defined by a set of pre-mapped coordinates. Origin locations are stored in an origin location data store (not shown) and include one or more pre-mapped pickup locations where the driver picks up the rider for transportation to the destination location.

Responsive to receiving the request for service, a client positioning module determines an initial topological location of a rider's client device in a topological graph that includes a pickup location associated with the origin location. As the rider progresses to the pickup location, the client positioning module periodically determines the topological location based on the relative signal strength of radio signals received at the rider's client device. In some embodiments, the client positioning module also monitors the geospatial location of the client device. The client positioning module sends the topological and geospatial location information to a client ETA module, which determines the rider's estimated time of arrival ("RETA") at the pickup location based on the rider's rate of travel through the origin location, represented by nodes on the topological graph.

Responsive to a determination by the client ETA module that the RETA is within a threshold amount of time of the average ETA of nearby available drivers ("DETA") at the pickup location (e.g., the RETA and the average ETA of available drivers are both five minutes), the trip management module matches the rider with one of a plurality of available drivers. The trip management module matches the rider with an available driver based on information about the driver (e.g., current location and status), information from the trip request (e.g., origin location and/or destination location), and/or a comparison of the RETA and the DETA. In some embodiments, if, after having matched the rider with an available driver, the trip management module determines that the RETA and the DETA vary by over a threshold amount of time, the trip management module selects a new driver based on a comparison of the RETA and the ETA of other nearby available drivers.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
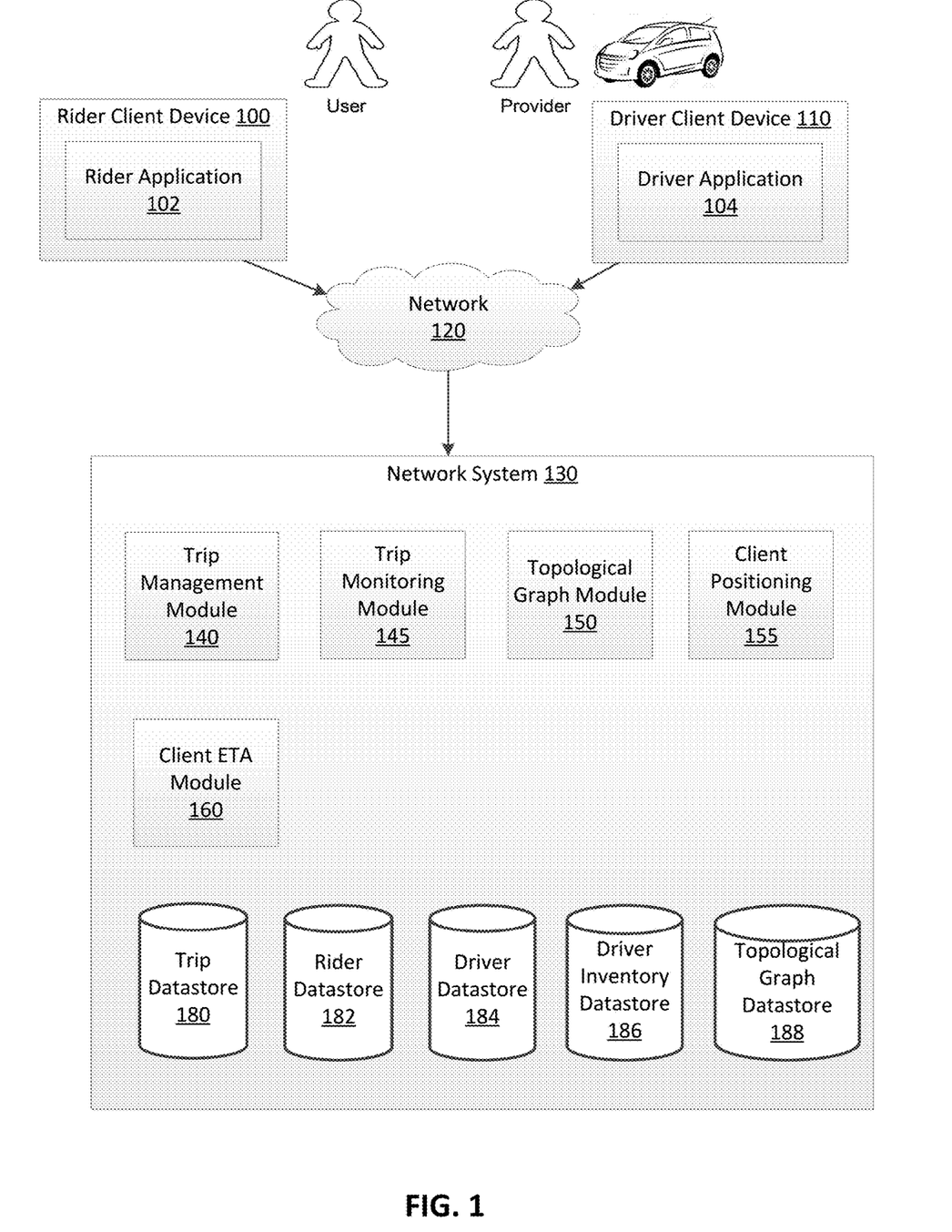
FIG. 1 illustrates the system environment for an example network system, in accordance with an embodiment.

Turning now to the specifics of the system architecture, FIG. 1 illustrates a system environment for an example network system 130. In the example of FIG. 1, the network system 130 coordinates the transportation of persons and/or goods/items for a user (e.g., such as a rider) by a service provider (e.g., a driver of a vehicle). The driver uses a vehicle to provide the transportation to the rider. In this example embodiment, the network system 130 includes a trip management module 140, a trip monitoring module 145, a topological graph module 150, a client positioning module 155, a client ETA module 160, and various data stores including a trip data store 180, a rider data store 182, a driver data store 184, a driver inventory data store 186, and a topological graph data store 188. These modules and data stores are not native components of a generic computer system, and provide structures and functions beyond generic functions of a computer system, as further described below.

A rider operates a client device 100 that executes a rider application 102 that communicates with the network system 130. The rider operates the rider application 102 to view information about the network service 130, and to make a request for service from the network system 130 for a delivery or transport service ("a trip") of the rider (and, optionally, additional persons) and/or items, for example cargo needing transport. The rider application 102 determines a pickup location within an origin location as discussed above or enables the rider to specify a pickup location and/or a destination location associated with the trip. An origin location and/or a destination location may be a location inputted by the rider or may correspond to the current location of the rider client device 100 as determined automatically by a location determination module (not shown) in the rider client device 100, e.g., a global positioning system (GPS) component, a wireless networking system, or a combination thereof. For purposes of simplicity, as described herein, an origin location can include a pickup location for service (i) determined by the rider application 102 (e.g., based on the current location of the rider client device 100 using a GPS component), (ii) specified or selected by the rider, or (iii) determined by the network system 130. In some embodiments, the network system 130 recommends a pickup location to a rider based on historical trip data associated with the origin location.

According to examples herein, the rider client device 100 can transmit a set of data (e.g., referred to herein as "service data") to the network system 130 over the network(s) 120 in response to rider input or operation of the rider application 102. Such service data can be indicative of the rider's interest in potentially requesting service (e.g., before actually confirming or requesting the service). For example, the rider may launch the rider application 102 and specify an origin location and/or a destination location to view information about the network service before making a decision on whether to request service. The rider may want to view information about the average or estimated time of arrival for pick up by a driver, the estimated time to the destination, the price, the available service types, etc. Depending on implementation, the service data can include the origin and/or destination location information, rider information (e.g., identifier), application information (e.g., version number), device identifier or type, etc. According to some examples, each time the rider modifies the origin and/or destination location, the rider application 102 can generate and transmit the service data to the network system 130.

Once the rider confirms or orders a service via the rider application 102, the rider application 102 can generate data corresponding to a request for the service through the network system 130 (e.g., also referred to herein as a "trip request"). Responsive to receiving a trip request, the network system 130 determines the average ETA at the pickup location of drivers whose current location is within a threshold distance of the pickup location (e.g., drivers who are all within one mile of the pickup location). In some embodiments, responsive to determining that the RETA is within a threshold amount of time of the average ETA of nearby available drivers (e.g., the RETA and the average DETA are both five minutes), the network system 130 uses information from the trip request to match the rider with an available driver. Depending on implementation, the trip request can include rider or device information (e.g., a rider identifier, a device identifier), a service type (e.g., vehicle type) and/or selected service option (such as described herein), an origin location, a destination location, a payment profile identifier, a desired departure time, and/or other data. The network system 130 selects a driver from a set of drivers, such as based on the driver's current location and status (e.g., offline, online, available, etc.) and/or information from the trip request (e.g., service type, origin location, and/or destination location), to provide the service for the rider and transport the rider from the origin location to the destination location. Responsive to selecting an available driver, the network system 130 sends an invitation message to the driver client device 110 inviting the driver to fulfill the trip request.

In one embodiment, the network system 130 periodically determines the RETA at the pickup location based on the topological and geospatial location of the rider client device 100. In some embodiments, the network system 130 selects the driver based on a comparison of the RETA and the DETA at the pickup location. For example, if the network system 130 determines that the rider is about three minutes away from the pickup location, the network system 130 might select a driver who is also about 3 minutes away even if other drivers have a shorter ETA. If, after matching the rider with an available driver, the network system 130 determines that the RETA and the DETA at the pickup location vary by over a threshold amount of time, the network system 130 can reassign the trip to another available driver, as described below. The rider client application 102 further enables a rider to provide a performance rating for a driver upon completion of a trip. In one embodiment, the rating is provided on a scale of one to five, five being the maximal (best) rating.

The driver operates a client device 110 executing a driver application 104 that communicates with the network system 130 to provide information indicating whether the driver is available or unavailable to provide transportation services to riders. The driver application 104 can also present information about the network system 130 to the driver, such as invitations to provide service, navigation instructions, map data, etc. In one embodiment, the driver application 104 enables the driver to provide information regarding availability of the driver by logging into the network system 130 and activating a setting indicating that they are currently available to provide service. The driver application 104 also provides the current location of the driver or the driver client device 110 to the network system 130. Depending on implementation, the current location may be a location inputted by the driver or may correspond to the current location of the driver client device 110 as determined automatically by a location determination module (not shown) in the driver client device 110, e.g., a GPS component, a wireless networking system, or a combination thereof. The driver application 104 further allows a driver to receive, from the trip management module 140, an invitation message to provide a service for a requesting rider, and if the driver accepts via input, the driver application 104 can transmit an acceptance message to the trip management module 140. The trip management module 140 can subsequently provide information about the driver to the rider application 102. As another embodiment, the driver application 104 can enable the driver to view a list of current trip requests and to select a particular trip request to fulfill. The driver application 104 can also receive routing information from the trip management module 140. The driver application 104 enables a driver to provide a rating for a rider upon completion of a trip. In one embodiment, the rating is provided on a scale of one to five, five being the maximal (best) rating.

The rider client device 100 and driver client device 110 are portable electronic devices such as smartphones, tablet devices, wearable computing devices (e.g., smartwatches) or similar devices. Alternatively, the driver client device 110 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities.

The rider client device 100 and the driver client device 110 interact with the network system 130 through client applications configured to interact with the network system 130. The applications 102 and 104 of the rider client device 100 and the driver client device 110, respectively, can present information received from the network system 130 on a rider interface, such as a map of the geographic region, and the current location of the rider client device 100 or the driver client device 110. The applications 102 and 104 running on the rider client device 100 and the driver client device 110 can determine the current location of the device and provide the current location to the network system 130.

The trip management module 140 is configured as a communicative interface between the rider application 102, the driver application 104, and the various modules and data stores in the network system 130, and is one means for performing this function. The trip management module 140 is configured to receive driver availability status information and current location information from the driver application 104 and update the driver inventory data store 186 with the availability status. The trip management module 140 is also configured to receive trip requests from the rider application 102 and creates corresponding trip records in the trip data store 180. According to an example, a trip record corresponding to a trip request can include or be associated with a trip ID, a rider ID, an origin location, a destination location, a service type, pricing information, and/or a status indicating that the corresponding trip request has not been processed. According to one example, when a driver accepts the invitation message to service the trip request for the rider, the trip record can be updated with the driver's information as well as the driver's location and the time when the trip request was accepted. Similarly, location and time information about the service as well as the cost for the service can be associated with the trip record.

In one embodiment, during the trip, the trip monitoring module 145 receives information (e.g., periodically) from the driver application 104 indicating the location of the driver's vehicle and/or telematics information (e.g., indications of current speed, acceleration/deceleration, events, stops, and so forth). The trip monitoring module 145 stores the information in the trip data store 180 and can associate the information with the trip record. In some embodiments, the trip monitoring module 145 periodically calculates the DETA at the pickup location and provides the DETA to the rider application 102.

The topological graph module 150 maintains a topological graph associated with a geographic region including the origin location. The topological graph contains a series of nodes connected by a series of edges. In one embodiment, each node in the topological graph represents a cluster of radio signatures representing a topological location. For example, in an airport, nodes in the topological graph might include various terminals and gates, baggage claim areas, and doors. For an office building, nodes might represent different floors and the lobby. In a shopping mall, nodes might correspond to different stores, and, for larger stores, different sections of the store. In some embodiments, nodes include beacons associated with a low power short range wireless protocol, such as those deployed by a business and explicitly labeled by the business deploying them.

The topological graph may contain both labeled and unlabeled nodes. In some embodiments, the nodes are labeled via manual collection operations, enabling association of radio signal clusters with specific locations (e.g., manual labeling of beacons by associated businesses). In other embodiments, nodes are unlabeled (e.g., if the nodes arise from clustering of crowd-sourced signature data). For example, the topological graph module 150 might know that the expected time from node A to node B in a topological graph is 3 minutes and that the expected time from node B to the pickup location outside is 1 minute, without knowing that node A is the fifth floor of an office building and that node B is the lobby. In still other embodiments, some nodes are labeled and others are unlabeled.

In various embodiments, the topological graph contains both indoor and outdoor nodes. The client positioning module 155 determines whether a node is indoors or outdoors based on the similarity of radio scans. In some embodiments, any ingress/egress point in the geographic region represented in the topological graph is included as a node. Additionally, a topological graph might contain a series of outdoor nodes such that the network system 130 can monitor a rider's progress to the pickup location when the pickup location is not immediately adjacent to a door. Further, each pickup location is represented as a terminal node in the topological graph.

The edges in the topological graph represent areas between the nodes in the topological graph. In some embodiments, the edges are labeled with an estimated travel time, or more generally, the probability distribution of the travel time, between any two nodes in the topological graph based on historical trip data. In other embodiments, edges are labeled with transition likelihoods (i.e., the likelihood that a rider will transition from one node to another). In still other embodiments, edges are labeled with step counts, or more generally, step count distributions, during transitions.

The topological graph module 150 uses historical trip data to generate the edges between nodes (e.g., for an office building, the area between the first floor and the lobby) and estimate the travel time between any two nodes in the topological graph (e.g., the topological graph module 150 might estimate that it takes one minute to travel from the first floor of the building to the lobby based on past instances of riders traversing the same edge). For each rider that travels through the topological graph, the client ETA module 160 tracks the amount of time it takes for the rider to travel between nodes and sends the data points to the topological graph module 150, which aggregates the data to generate an expected travel time between any two nodes and sends the expected travel time to the topological graph data store 188 for storage. In some embodiments, the topological graph module 150 updates the expected travel time between nodes responsive to receiving a threshold number of data points that vary by more than a threshold amount from the expected travel time.

In some embodiments, the topological graph module 150 uses crowd-sourced data to construct and maintain the topological graph. For example, in some embodiments, measurements include radio signatures (such as Wi-Fi or Bluetooth signals), accelerometer, gyroscope, barometer, and magnetometer readings, as well as absolute location estimates (e.g., via GNSS) when available. For pedestrians, the topological graph module 150 determines inertial measurements based on step detection and step count based on measurements taken from a rider client device 100 over a time period prior to pick-up at the pickup location and after drop-off at the destination location, depending on the permissions obtained from the rider. In some embodiments, the topological graph module 150 obtains analogous measurements from the driver client device 110 and/or other devices in the vehicle (e.g., sensors for a self-driving vehicle).

The client positioning module 155 determines the geospatial and topological location of the rider client device 100 in response to the rider making a trip request through the rider application 102. In one embodiment, the rider application 102 periodically transmits geospatial location information of the rider client device 100 to the network system 130. The geospatial location information can correspond to a current location data point of the rider client device 100 at an instance in time. Such a location data point can be generated by a location determination module (not shown) in the rider client device 100, e.g., a GPS component, a wireless networking system, or a combination thereof.

In some embodiments, the rider application 102 transmits the geospatial location information when the rider application 102 is closed from being displayed on the rider client device 100 (e.g., is running in the background), but not shut down entirely. The client positioning module 155 periodically receives the geospatial location information of the rider client device 100 from the location determination module (e.g., every two seconds, every five seconds, etc.) and sends the geospatial location information to the client ETA module 160.

The client positioning module 155 also determines the topological location of the rider client device 100 based on the position of the rider client device 100 in a topological graph covering a geographic region including the origin location. Determining the rider's topological location allows the network system 130 to track the rider's progress through the topological graph and estimate the RETA at the pickup location.

The client positioning module 155 determines the topological location of the rider based on the relative signal strength of radio signals received at the rider client device 100 and transmitted from the rider client device 100 to the network system 130. In one embodiment, each radio signal is associated with a received signal strength (RSS) from an indoor wireless local area network. The rider client device 100 receives a plurality of signal strength indicators from a plurality of radio transmitters, and sends the RSS indicators to the client positioning module 155, which determines the topological location of the computing device according to the relative strength of the received signals. The rider client device 100 performs a Wi-Fi scan to determine the radio frequency (RF) signature of a node in the topological graph. In some embodiments, the RSS varies based on the combination of signals traversing different paths from transmitters to receivers. RSS also varies depending on changes in the environment, such as the number of people, open versus closed doors, and changes in the furniture. Thus, the client positioning module 155 accounts for statistical fluctuations when inferring a rider's topological location.

In some embodiments, topological location determination is performed on the rider client device 100 using cached information stored on the rider client device 100. For example, the cached information might include radio signatures corresponding to nodes on the topological graph. In other embodiments, topological location determination is a hybrid task performed by both the rider client device 100 and the client positioning module 155.

Prior approaches have tried to estimate the location of access points and localize a rider client device based on absolute location using Global Navigation Satellite Systems (GNSS). While GNSS-based absolute location is generally unavailable or of poor quality indoors, the client positioning module 155 can use GNSS to determine the absolute location of the rider client device 100 at an outdoor node. Triangulating the location of a rider client device using GNSS is further described in U.S. patent application Ser. No. 15/396,297, filed on Dec. 30, 2016, which is hereby incorporated by reference in its entirety. Further, in some embodiments, the topological graph module 150 can use absolute location estimates obtained via GNSS locations of rider client devices 100 before and detecting a radio signal from an access point to organize the topological graph and to reduce the scope of the topological graph being used to infer the location of the rider client device 100.

In one embodiment, the client positioning module 155 periodically determines the topological location of the rider client device 100 (e.g., every two seconds, every five seconds, etc.) and sends the topological location, along with the geospatial location received from the rider application 102, to the client ETA module 160, which uses the topological and geospatial location information to update the ETA of the rider at the pickup location. In some embodiments, the client ETA module 160 updates an initial RETA calculated immediately after the rider made the trip request through the rider application 102. In other embodiments, the client ETA module 160 updates subsequent RETA calculations based on the rider's progress through the topological graph.

In some embodiments, the client ETA module 160 calculates the RETA at the pickup location each time the client positioning module 155 updates the geospatial and topological location of the rider client device 100. In other embodiments, the client ETA module 160 updates the RETA on a specified basis (e.g., every 30 seconds, every 2 minutes, etc.). In still other embodiments, the client ETA module 160 updates the RETA at the pickup location responsive to a request from the driver application 104.

The client ETA module 160 calculates the position of the rider as he progresses through the graph toward the pickup location by monitoring the relative signal strength of radio signals received at the rider client device 100. The client ETA module 160 calculates the rate of travel based on the position of the rider client device 100 at one instance in time and the position of the rider client device 100 at previous instances in time. The client ETA module 160 determines the RETA at the pickup location based on the rider's rate of travel through the origin location and the associated nodes on the topological graph. Accordingly, the RETA can dynamically change at different instances in time, as the rider changes positions and speeds while traveling from the location at which the trip request is made to the pickup location.

In some embodiments, the client ETA module 160 compares the RETA at the pickup location with the DETA calculated by the trip monitoring module 145. If the RETA and the DETA vary by over a threshold amount of time (e.g., the driver will arrive at the pickup location 5 minutes before the rider), the client ETA module 160 will notify the trip management module 140. In some embodiments, depending on the number and location of other available drivers, the trip management module 140 selects a new driver from the set of available drivers based on a comparison of the RETA and the ETA of other available drivers and sends the new driver information to the rider client device 100.

Figure 2:
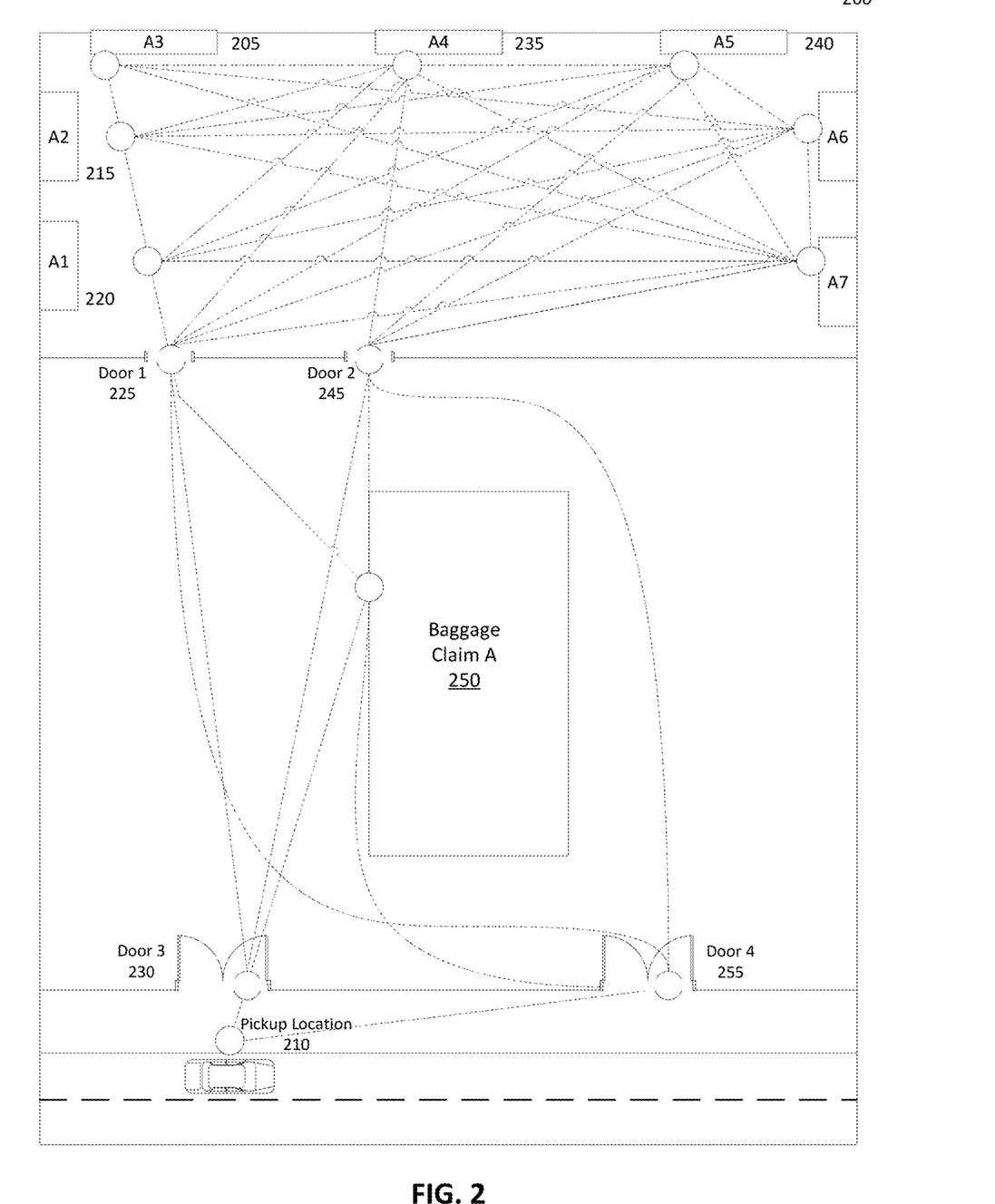
FIG. 2 illustrates conceptually a rider's progress through a topological graph to a pickup location, in accordance with an embodiment.

FIG. 2 illustrates a rider's progress through a topological graph associated with an airport terminal, terminal A 200, to a pickup location, in accordance with an embodiment. As illustrated in FIG. 2, a series of nodes representing clusters of radio signatures are connected by a series of edges representing travel between nodes.

In the example illustrated in FIG. 2, a rider arrives at gate A3 205 and submits service data corresponding to a trip request through the rider client application 102 setting terminal A 200 of the airport as the origin location. In some embodiments, the rider selects a pickup location 210 (e.g., if the rider is familiar with the layout of the airport). In other embodiments, the network system 130 recommends a pickup location 210 based on historical trip data associated with the origin location (e.g., the pickup location for previous trips originating at terminal A).

The client positioning module 155 determines the rider's current topological location based on radio signal and inertial measurements from the rider client device 100, as discussed above with respect to FIG. 1. In some embodiments, the client positioning module 155 also determines the geospatial location of the rider client device 100 based on location data generated by a location determination module on the rider client device 100. Responsive to determining the initial geospatial and topological location of the rider client device 100, the client positioning module 155 sends the location information to the client ETA module 160, which uses the location information to estimate the RETA at the pickup location 210. In some embodiments, the client positioning module 155 estimates the RETA based on the topological location of the rider client device 100. In other embodiments, the client positioning module 155 uses both the topological location and the geospatial location to estimate the RETA at the pickup location.

The rider encounters a series of edges and nodes as she travels from gate A3 205 (i.e., the location where the trip request was made) to the pickup location 210. As the rider moves through the airport, the client positioning module 155 and the RETA module 160 use radio signals from the rider client device 100 to determine the node or edge in the topological graph the rider is traversing and to update the RETA at the pickup location 210. In some embodiments, the rider's movement through the topological graph is bimodal. For example, the rider might travel through the topological graph directly from gate A3 205 to gate A2 215 to gate A1 220 to door 1 225 to door 3 230 to the pickup location 210, each represented by a node on the topological graph. Alternatively, the rider's movement through the airport is multimodal (e.g., depending on the rider's familiarity with the layout of the airport). For example, the rider might travel from gate A3 205 to A4 235 to A5 240 before realizing that he is traveling away from the exit. Once the rider corrects his or her path towards the exit, the rider might travel through door 2 245, stop at baggage claim A 250, and exit the airport through door 4 255 before arriving at the pickup location 210. As the rider travels through the airport, the client ETA module 160 adjusts the RETA at the pickup location 210 based on the rider's progress through the nodes. For example, if the rider makes steady progress through the nodes and is approaching door 3 230, the node closest to the pickup location 210, the client ETA module 160 adjusts the RETA to a smaller value. Conversely, if the rider has stopped and the radio signatures indicate that the rider client device 100 is located in the baggage claim area, the client ETA module 160 adjusts the RETA to account for the delay due to waiting for and collecting the rider's baggage. The client ETA module 160 tracks both the topological location of the rider as well as the rider state, which may have intrinsic components as well as contextual components. Intrinsic state may correspond to the rider's current activity (e.g., walking or stopped, as determined by measurements from inertial sensors). Contextual state is associated with the rider's topological location (e.g., how long has the rider been stopped at a topological location corresponding to baggage claim).

The trip monitoring module 140 determines the ETAs at the pickup location of drivers whose current locations are within a threshold distance of the pickup location (e.g., drivers who are within one mile of the pickup location). The client ETA module 160 takes as input the rider's RETA and these DETAs of nearby available drivers, and decides when to invoke the trip management module 140 for matching the rider with a driver. As an example embodiment, when the client ETA module 160 determines that the RETA is within a threshold amount of time of the average ETA of nearby available drivers, the trip management module 140 matches the rider with one of a plurality of available drivers. The trip management module 140 selects an available driver to fulfill the trip request based on driver information (such as the driver's current location, the DETA, and/or status), and/or information from the trip request (such as service type, origin location, destination location, and/or RETA). In some embodiments, the trip management module 140 selects an available driver based in part on a comparison between the RETA and the DETA of the available driver at the pickup location 210. For example, if the client ETA module 160 estimates that the rider will arrive at the pickup location 210 in about 4 minutes, the trip management module 140 selects a driver who is also approximately 4 minutes away from the pickup location 210 (e.g., the DETA of the selected driver is 4 minutes). In some embodiments, if after matching the rider with an available driver, the trip management module 140 determines that the RETA and the DETA of the driver vary by over a threshold amount of time, the trip management module 140 selects a new driver to fulfill the trip request based on a comparison of the RETA and the ETA of other available drivers.

Figure 3:
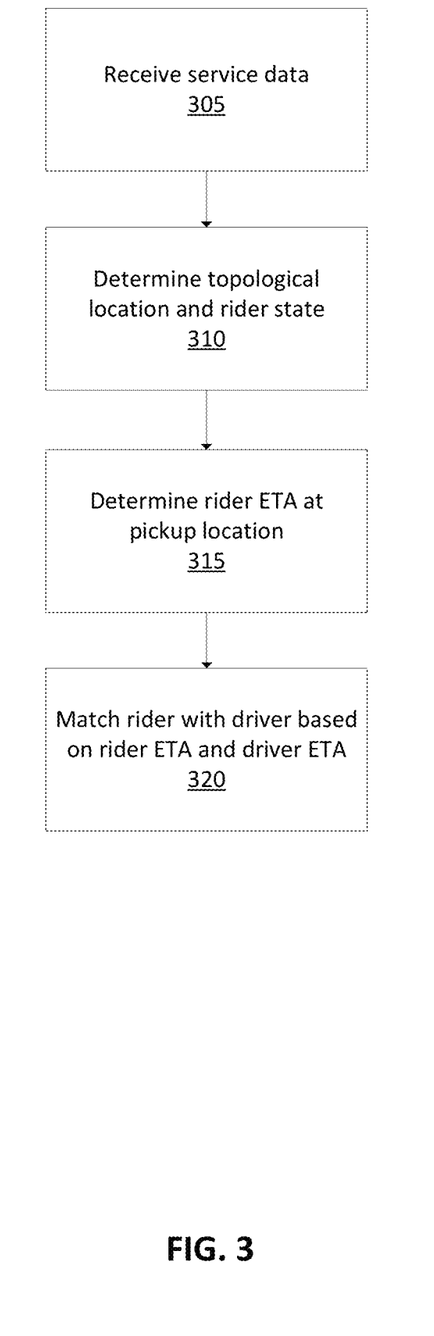
FIG. 3 is a flow chart for estimating the topological location of a rider client device, in accordance with an embodiment.

FIG. 3 illustrates a flow chart for determining a RETA at a pickup location based on a topological location of the rider client device 100, in accordance with an embodiment. The network system 130 receives 305 a set of service data from a rider client device 100. In some embodiments, the set of service data includes an origin location and a request for a driver to transport the rider from the origin location.

At 310, the client positioning module 155 of the network system 130 determines a topological location of the rider client device 100 within a topological graph that includes a pickup location associated with the origin location. In one embodiment, the rider client device 100 performs a Wi-Fi scan to determine a RF signature of a node in the topological graph. Additionally or alternatively, the client positioning module 155 determines the intrinsic rider state corresponding to the rider's current activity (e.g., walking or stopped, as determined by measurements from inertial sensors on the rider client device 100).

In some embodiments, the client positioning module 155 also determines a geospatial location of the rider client device 100 based on data received from a location determination module on the rider client device 100. The client positioning module 155 sends the topological and geospatial location information to the client ETA module 160, which determines 315 the RETA at the pickup location. In some embodiments, the RETA is based on historical trip data associated with the origin location (e.g., how long it has taken other riders to navigate the same edges in the topological graph).

Responsive to determining the RETA at the pickup location, the trip management module 140 matches 320 the rider with one of a plurality of available drivers based on a comparison of the RETA and the DETA at the pickup location. In some embodiments, the trip management module 140 considers information about the driver (e.g., current location and status) and/or information from the trip request (e.g., origin location and/or destination location) when matching the rider with an available driver.

Figure 4:
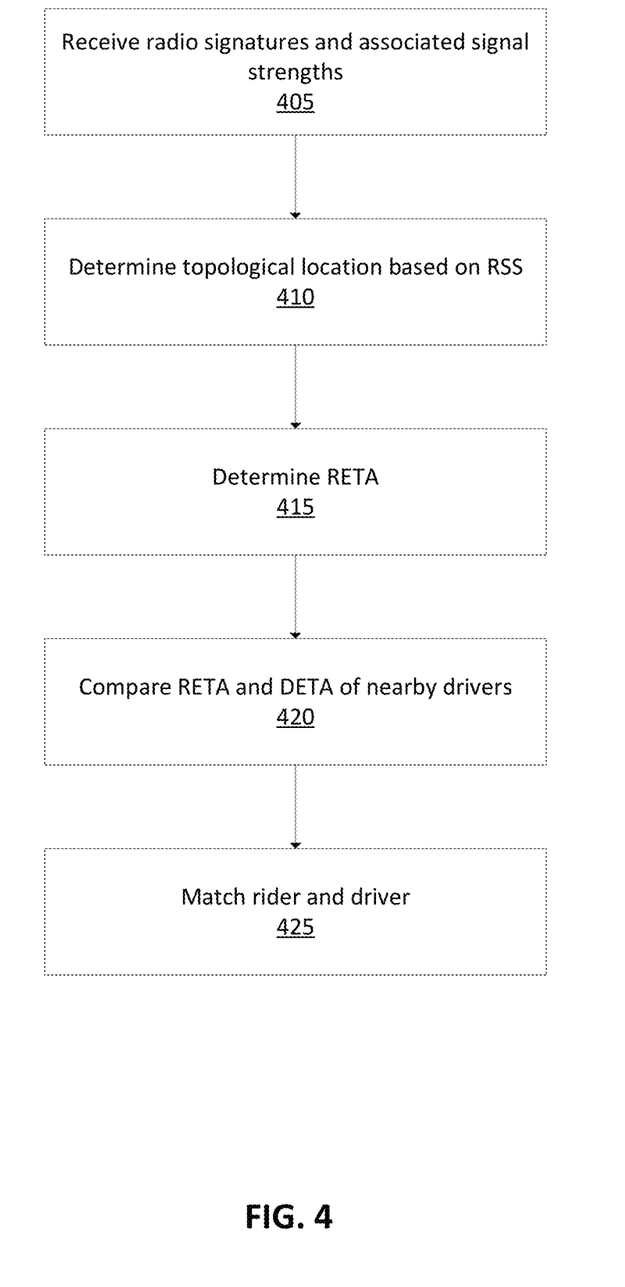
FIG. 4 is a flow chart for matching a rider with a driver based on a comparison of the RETA and the DETA, in accordance with an embodiment.

FIG. 4 illustrates a flow chart for matching a rider with a driver based on a comparison of the RETA and the DETA, in accordance with an embodiment. The client positioning module 155 receives 405 from the rider client device 100 a plurality of signal strength indicators associated with radio signals received at the rider client device 100 from a plurality of radio transmitters. In one embodiment, each radio signal is associated with a RSS from an indoor local area network. In another embodiment, each radio signal is associated with a RSS from a beacon associated with a low power short range wireless protocol.

The client positioning module 155 determines 410 the topological location of the rider client device 100 based on the RSS of the received radio signals. In some embodiments, the client positioning module 155 accounts for statistical fluctuations (e.g., changes in the environment, combinations of different signals traversing different paths from transmitters to receivers) when determining the rider's topological location.

The client positioning module 155 periodically determines the topological location of the rider client device 155 (e.g., every two seconds), and sends the location information to the client ETA module 160, which uses the topological location information to determine 415 the RETA at the pickup location based on the rider's rate of travel through the origin location and the associated nodes on the topological graph. In some embodiments, the client ETA module 160 determines the RETA each time the client positioning module 155 determines the topological location of the rider client device 100. In other embodiments, the client ETA module 160 determines the RETA on a specified basis (e.g., every 15 seconds, every 60 seconds, etc.). In still other embodiments, the client ETA module 160 updates the RETA responsive to a request from the driver application 104.

The client ETA module 160 compares 420 the RETA with the average DETA of nearby available drivers. Responsive to determining that the RETA and the average DETA are within a threshold amount of time of each other, the client ETA module 160 notifies the trip management module 140, which matches 425 the rider with one of the available drivers, as discussed above with respect to FIG. 1.

Figure 5:
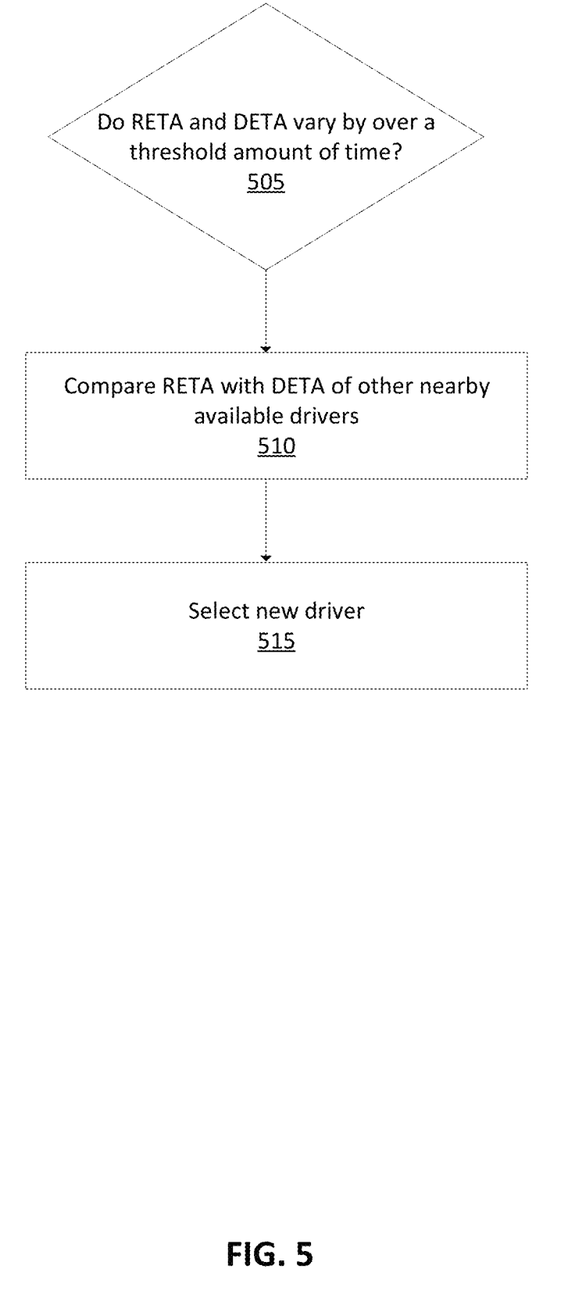
FIG. 5 is a flow chart for matching a rider with a second driver responsive to determining that the RETA and the DETA of a first driver vary by over a threshold amount of time, in accordance with an embodiment.

FIG. 5 illustrates a flow chart for matching a rider with a second driver responsive to determining that the RETA and the DETA of a first driver vary by over a threshold amount of time, in accordance with an embodiment. After the trip management module 140 matches the rider with a nearby available driver, the client ETA module 160 compares 505 the RETA with the DETA of the assigned driver calculated by the trip monitoring module 145. If the RETA and the DETA of the assigned driver vary by over a threshold amount of time, the client ETA module 160 notifies the trip management module 140, which decides to reassign the rider to a driver whose ETA at the pickup location is within a threshold amount of time of the RETA. The trip management module 140 instructs the client ETA module 160 to compare 510 the RETA with the DETA of other nearby available drivers. The client ETA module 160 returns the ETA comparison information to the trip management module 140, which selects 515 a new driver whose ETA at the pickup location is within a threshold amount of time of the RETA.

Figure 6:
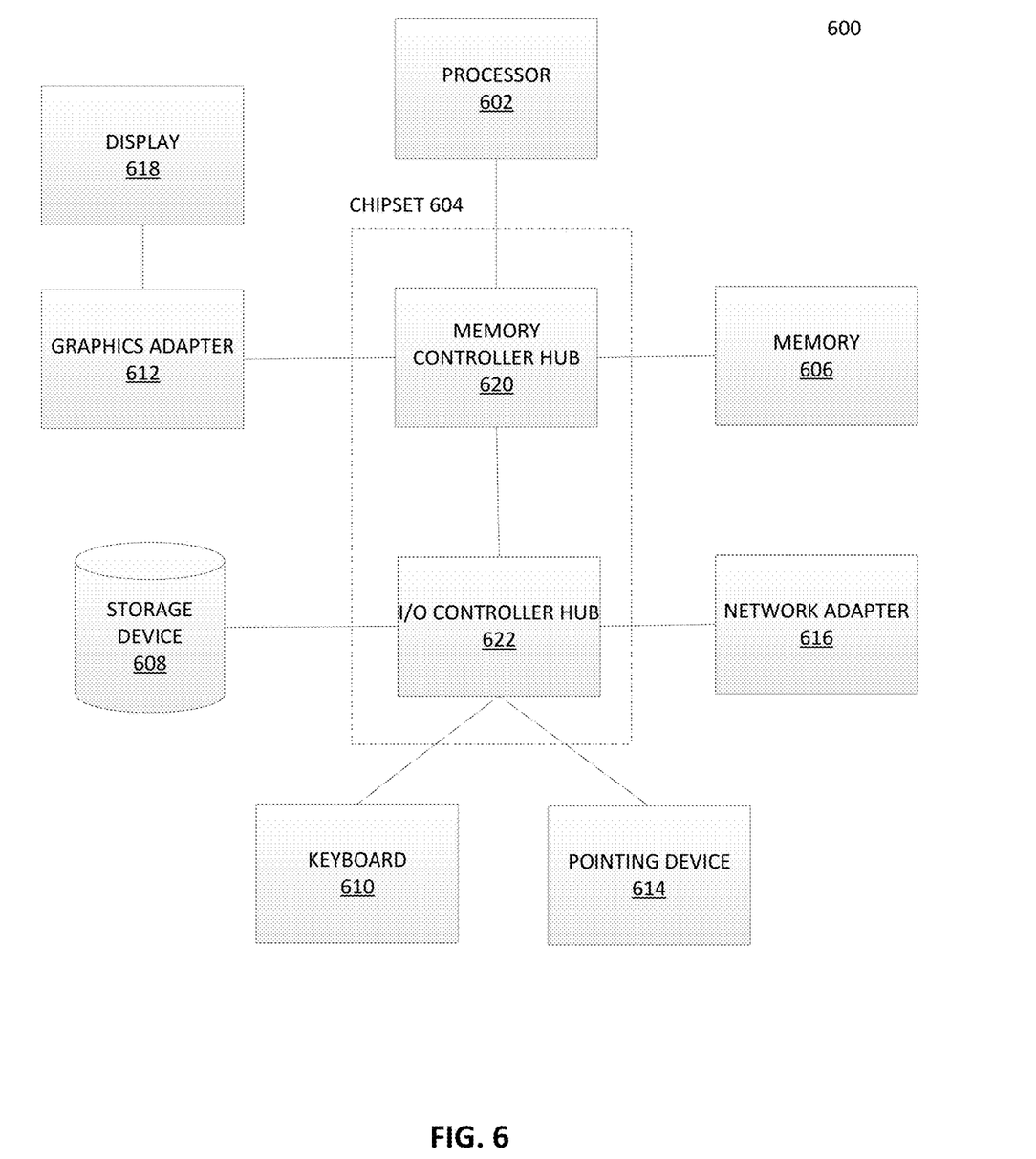
FIG. 6 illustrates example components of a computer used as part or all of the network system, the rider client device, and/or the driver client device, in accordance with an embodiment.

FIG. 6 is a block diagram illustrating physical components of a computer 600 used as part or all of the network system 130, rider client device 100, or driver client device 110 from FIG. 1, in accordance with an embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600, such as a host or smartphone, may lack a graphics adapter 612, and/or display 618, as well as a keyboard 610 or external pointing device 614. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

What is claimed is:

1. A computer-implemented method for matching users for transportation services, the method comprising:
    receiving, at a network system including one or more processors, from a computing device associated with a first user, a set of service data including a request for a second user to transport the first user from an origin location;
    determining, by the network system, a topological location of the computing device within a topological graph that includes a pickup location associated with the origin location, wherein the topological location is determined according to a plurality of signal strength indicators from a plurality of radio signals associated with one or more terrestrial wireless local area networks and received at the computing device;
    determining, by the network system, a state of the computing device,
    determining, based on the topological location and the state of the computing device, an estimated time of arrival of the first user at the pickup location;
    matching the first user with the second user based the estimated time of arrival of the first user; and
    sending an invitation to a computing device associated with the second user inviting the second user to fulfill the request.

2. The method of claim 1, wherein the estimated time of arrival of the first user at the pickup location is further determined by:
    receiving a geospatial location of the computing device; and
    determining, based on the geospatial location and the topological location, an estimated time of arrival of the first user at the pickup location.

3. The method of claim 1, further comprising:
    determining a second topological location of the computing device; and
    determining an updated estimated time of arrival of the first user at the pickup location.

4. The method of claim 3, further comprising:
    comparing the updated estimated time of arrival of the first user with an estimated time of arrival of the second user at the pickup location; and
    responsive to the updated estimated time of arrival of the first user and the estimated time of arrival of the second user varying by more than a threshold amount of time, matching the first user with a third user.

5. The method of claim 4, wherein the third user has an estimated time of arrival that is within a threshold amount of time of the updated estimated time of arrival of the first user.

6. The method of claim 1, wherein each radio signal is associated with a wireless signal.

7. The method of claim 1, wherein each radio signal is associated with a beacon associated with a low power short range wireless protocol.

8. The method of claim 1, wherein the topological graph is associated with an airport and wherein nodes in the topological graph are associated with one or more of: airport terminals, airport gates, baggage claim areas, or doorways.

9. The method of claim 1, wherein the estimated time of arrival of the first user at the pickup location is further determined by:
    receiving an intrinsic state of the computing device;
    receiving a contextual state of the computing device; and
    determining, based on the topological location, the intrinsic state, and the contextual state, an estimated time of arrival of the first user at the pickup location.

10. A non-transitory computer-readable storage medium storing computer-executable instructions that, in response to executing, cause a device comprising a processor to perform operations, comprising:
    receiving, at a network system including one or more processors, from a computing device associated with a first user, a set of service data including a request for a second user to transport the first user from an origin location;
    determining, by the network system, a topological location of the computing device within a topological graph wherein the topological location is determined according to a plurality of signal strength indicators from a plurality of radio signals associated with one or more terrestrial wireless local area networks and received at the computing device;

receiving a geospatial location of the computing device;

determining, based on the topological location and the geospatial location, an estimated time of arrival of the first user at a pickup location associated with the origin location;

matching the first user with a second user based on the estimated time of arrival of the first user; and sending an invitation to a computing device associated with the second user inviting the second user to fulfill the request.

11. The non-transitory computer-readable storage medium of claim 10, wherein the operations further comprise:

receiving a second geospatial location of the computing device;

determining a second topological location of the computing device; and determining an updated estimated time of arrival of the first user at the pickup location.

12. The non-transitory computer-readable storage medium of claim 11, wherein the operations further comprise:

comparing the updated estimated time of arrival of the first user with an estimated time of arrival of the second user at the pickup location; and responsive to the updated estimated time of arrival of the first user and the estimated time of arrival of the second user varying by more than a threshold amount of time, matching the first user with a third user.

13. The non-transitory computer-readable storage medium of claim 12, wherein the third user has an estimated time of arrival that is within a threshold amount of time of the updated estimated time of arrival of the first user.

14. The non-transitory computer-readable storage medium of claim 10, wherein each radio signal is associated with a wireless signal.

15. The non-transitory computer-readable storage medium of claim 10, wherein each radio signal is associated with a beacon associated with a low power short range wireless protocol.

16. The non-transitory computer-readable storage medium of claim 10, wherein the topological graph is associated with an airport and wherein nodes in the topological graph are associated with one or more of: airport terminals, airport gates, baggage claim areas, or doorways.

17. The non-transitory computer-readable storage medium of claim 10, wherein the estimated time of arrival of the first user at the pickup location is further determined by:

receiving an intrinsic state of the computing device;

receiving a contextual state of the computing device; and determining, based on the topological location, the intrinsic state, and the contextual state, an estimated time of arrival of the first user at the pickup location.

18. A computer system comprising:

one or more computer processors for executing computer program instructions; and a non-transitory computer-readable storage medium storing instructions executable by the one or more computer processors to perform steps comprising:

receiving, at a network system including one or more processors, from a computing device associated with a first user, a set of service data including a request for a second user to transport the first user from an origin location;

determining, by the network system, a topological location of the computing device within a topological graph that includes a pickup location associated with the origin location, wherein the topological location is determined according to a plurality of signal strength indicators from a plurality of radio signals associated with one or more terrestrial wireless local area networks and received at the computing device;

determining a state of the computing device, wherein the state of the computing device includes an intrinsic state and a contextual state;

determining, based on the topological location and the state of the computing device, an estimated time of arrival of the first user at the pickup location;

matching the first user with a second user based on the estimated time of arrival of the first user; and sending an invitation to a computing device associated with the second user inviting the second user to fulfill the request.

19. The computer system of claim 18, wherein the estimated time of arrival of the first user at the pickup location is further determined by:

receiving a geospatial location of the computing device; and determining, based on the geospatial location and the topological location, an estimated time of arrival of the first user at the pickup location.

20. The computer system of 19, further comprising:

receiving a second geospatial location of the computing device;

determining a second topological location of the computing device; and calculating an updated estimated time of arrival of the first user at the pickup location.

21. The computer system of claim 20, further comprising:

comparing the updated estimated time of arrival of the first user with an estimated time of arrival of the second user at the pickup location; and responsive to the updated estimated time of arrival of the first user and the estimated time of arrival of the second user varying by more than a threshold amount of time, matching the first user with a third user.

22. The computer system of claim 21, wherein the third user has an estimated time of arrival that is within a threshold amount of time of the updated estimated time of arrival of the first user.

\* \* \* \* \*